United States Patent
Anderson et al.

(10) Patent No.: US 8,773,802 B1
(45) Date of Patent: Jul. 8, 2014

(54) DISK DRIVE RESETTING FLY HEIGHT REFERENCE GENERATED FROM A DEGRADING CALIBRATION TRACK

(75) Inventors: Kent D. Anderson, Broomfield, CO (US); Shafa Dahandeh, Laguna Niguel, CA (US); Galvin T. Chia, Rancho Santa Margarita, CA (US); Alvin W. Tan, Irvine, CA (US); Noureddine Kermiche, Mission Viejo, CA (US); Ming Jin, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 495 days.

(21) Appl. No.: 13/157,809

(22) Filed: Jun. 10, 2011

Related U.S. Application Data (60) Provisional application No. 61/376,449, filed on Aug. 24, 2010.

(51) Int. Cl.
*G11B 5/60* (2006.01)

(52) U.S. Cl.
USPC .............................................. 360/55; 360/75

(58) Field of Classification Search
None
See application file for complete search history.

(56) References Cited

U.S. PATENT DOCUMENTS

| | | |
|---|---|---|
| 5,377,058 A | 12/1994 | Good et al. |
| 6,147,488 A | 11/2000 | Bamba et al. |
| 6,266,199 B1 | 7/2001 | Gillis et al. |
| 6,307,817 B1 | 10/2001 | Tsuboi |
| 6,393,511 B1 | 5/2002 | Albrecht et al. |
| 6,501,606 B2 | 12/2002 | Boutaghou et al. |
| 6,570,378 B2 | 5/2003 | Goh et al. |
| 6,603,617 B1 | 8/2003 | Cross |
| 6,630,824 B2 | 10/2003 | Richter |
| 6,697,203 B1 | 2/2004 | Cheng et al. |
| 6,714,368 B1 | 3/2004 | Himle et al. |
| 6,898,033 B2 | 5/2005 | Weinstein et al. |
| 6,987,630 B1 | 1/2006 | Higgins et al. |

(Continued)

FOREIGN PATENT DOCUMENTS

| | | |
|---|---|---|
| JP | 2007179723 A | 7/2007 |
| JP | 2007293948 A | 11/2007 |

OTHER PUBLICATIONS

Tsai et al, "Configurable NAND Flash Translation Layer", Proceedings of the IEEE International Conference on Sensor Networks, Ubiquitous, and Trustworthy Computing (SUTC'06), Jun. 5-7, 2006, 8 pages.

(Continued)

*Primary Examiner* — Wayne Young
*Assistant Examiner* — James L Habermehl (57) ABSTRACT

A disk drive is disclosed comprising a head actuated over a disk and a fly height actuator operable to control a fly height of the head in response to a fly height control signal. A touchdown operation is executed to set an operating fly height control signal by adjusting the fly height control signal until the head contacts the disk. A fly height calibration track is then read to set a fly height reference. When calibrating the operating fly height control signal, the fly height calibration track is read and the operating fly height control signal is adjusted in response to the fly height reference. When the adjusted operating fly height control signal is invalid, the touchdown operation is re-executed to reset the operating fly height control signal and then the fly height calibration track is read to reset the fly height reference.

20 Claims, 5 Drawing Sheets

(56) References Cited

U.S. PATENT DOCUMENTS

| | | |
|---|---|---|
| 7,016,131 B2 | 3/2006 | Liu et al. |
| 7,038,875 B2 | 5/2006 | Lou et al. |
| 7,068,449 B2 | 6/2006 | Riddering et al. |
| 7,068,451 B1 | 6/2006 | Wang et al. |
| 7,180,692 B1 | 2/2007 | Che et al. |
| 7,196,860 B2 | 3/2007 | Alex |
| 7,209,304 B2 | 4/2007 | Seng et al. |
| 7,253,984 B1 | 8/2007 | Patapoutian et al. |
| 7,265,933 B1 | 9/2007 | Phan et al. |
| 7,324,299 B1 | 1/2008 | Schreck et al. |
| 7,330,324 B2 | 2/2008 | Morinaga et al. |
| 7,333,290 B1 | 2/2008 | Kupferman |
| 7,369,340 B1 | 5/2008 | Dang et al. |
| 7,408,731 B2 | 8/2008 | Uemura et al. |
| 7,423,830 B2 | 9/2008 | Ma et al. |
| 7,426,090 B2 | 9/2008 | Yamashita et al. |
| 7,468,854 B2 * | 12/2008 | Yamashita et al. ............. 360/75 |
| 7,477,465 B2 | 1/2009 | Yu |
| 7,483,234 B2 * | 1/2009 | Shimozato ................. 360/75 |
| 7,599,139 B1 | 10/2009 | Bombet et al. |
| 7,715,135 B1 | 5/2010 | Sutardja et al. |
| 7,719,781 B2 | 5/2010 | Ehrlich et al. |
| 7,719,785 B2 * | 5/2010 | Taniguchi et al. ............. 360/75 |
| 7,724,461 B1 | 5/2010 | McFadyen et al. |
| 7,738,206 B1 | 6/2010 | Lin et al. |
| 7,817,372 B2 * | 10/2010 | Takahashi ................. 360/75 |
| 7,830,632 B2 | 11/2010 | Tang et al. |
| 7,835,104 B2 * | 11/2010 | Yamashita et al. ............. 360/75 |
| 7,880,992 B2 | 2/2011 | Ozturk et al. |
| 7,889,448 B2 | 2/2011 | Lu |
| 7,948,704 B2 | 5/2011 | Ellis |
| 7,986,487 B1 | 7/2011 | Madden et al. |
| 7,995,304 B2 | 8/2011 | Ozturk et al. |
| 8,054,573 B2 | 11/2011 | Mathew et al. |
| 8,068,299 B2 | 11/2011 | Tsunokawa et al. |
| 8,098,451 B2 * | 1/2012 | Graef ............................. 360/75 |
| 8,139,307 B2 * | 3/2012 | Kim et al. ...................... 360/75 |
| 8,169,726 B2 * | 5/2012 | Wilson ........................... 360/31 |
| 8,462,454 B1 | 6/2013 | Katchmart |
| 2002/0062470 A1 | 5/2002 | Yang et al. |
| 2002/0063559 A1 | 5/2002 | Richter |
| 2003/0016461 A1 | 1/2003 | Seng et al. |
| 2003/0043491 A1 | 3/2003 | Riddering et al. |
| 2003/0067697 A1 | 4/2003 | Weinstein et al. |
| 2003/0132747 A1 | 7/2003 | Hong et al. |
| 2007/0174582 A1 | 7/2007 | Feldman |
| 2007/0268615 A1 | 11/2007 | McFadyen et al. |
| 2008/0130159 A1 | 6/2008 | Dieron et al. |
| 2008/0165443 A1 | 7/2008 | Moline |
| 2008/0165446 A1 | 7/2008 | Partee |
| 2008/0310043 A1 | 12/2008 | Masuda et al. |
| 2009/0153996 A1 | 6/2009 | Ellis |
| 2009/0195902 A1 | 8/2009 | Moser et al. |
| 2009/0195912 A1 | 8/2009 | Sato |
| 2009/0213486 A1 * | 8/2009 | Takahashi ................. 360/75 |
| 2010/0128386 A1 | 5/2010 | Keizer et al. |
| 2011/0075292 A1 | 3/2011 | New et al. |

OTHER PUBLICATIONS

Seagate Banded Device Feature Set, Slide Presentation F11131, Seagate, Aug. 16, 2011, 16 pages.

* cited by examiner

DISK DRIVE RESETTING FLY HEIGHT REFERENCE GENERATED FROM A DEGRADING CALIBRATION TRACK

CROSS-REFERENCE TO RELATED APPLICATIONS

The present application claims priority from provisional U.S. Patent Application Ser. No. 61/376,449, filed on Aug. 24, 2010, the specification of which is incorporated herein by reference.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The fringe field from the write element may also adversely affect a wider range of tracks with respect to the written track, a phenomena referred to as wide area track erasure or WATER. The degrading effect of ATI on the adjacent tracks as well as WATER on the near adjacent tracks compounds over time with each write operation to the target track. Eventually, the magnetic field emanating from the disk surface will deteriorate to the point that the data is no longer recoverable.

Figure 1:
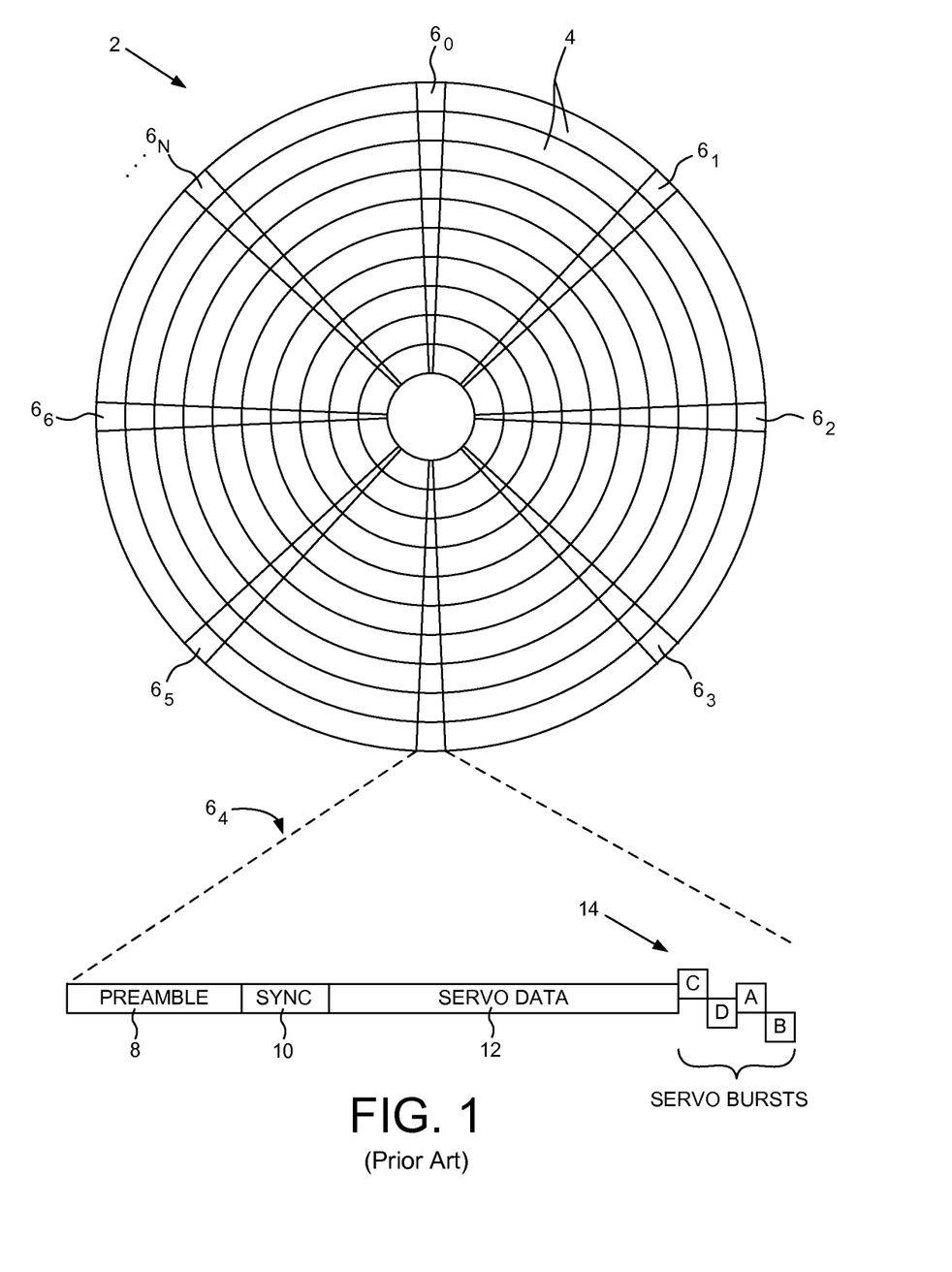
FIG. 1 shows a prior art disk format comprising a plurality of servo sectors that define a plurality of tracks.

FIG. 1 shows a prior art disk format 2 comprising a number of data tracks 4 defined by concentric servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 2A:
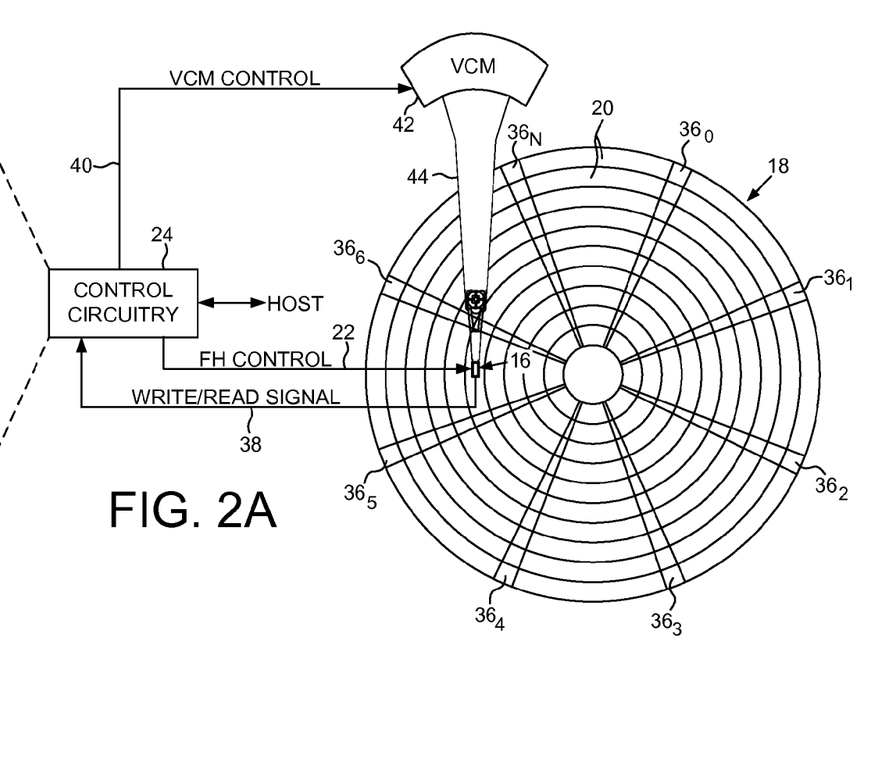
FIG. 2A shows a disk drive according to an embodiment of the present invention comprising a head actuated over a disk and control circuitry including a fly height actuator.
Figure 2B:
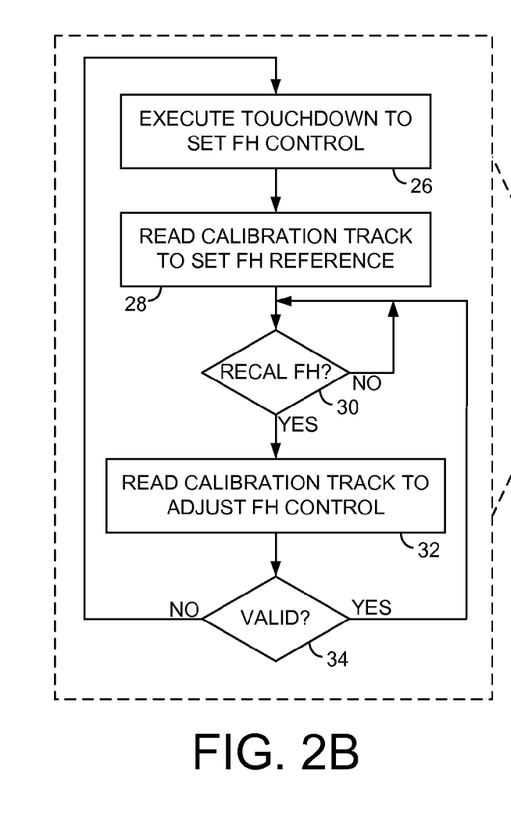
FIG. 2B is a flow diagram according to an embodiment of the present invention wherein if a fly height control signal is invalid after calibration, a touchdown operation is executed to reset a fly height reference.
Figure 3A:
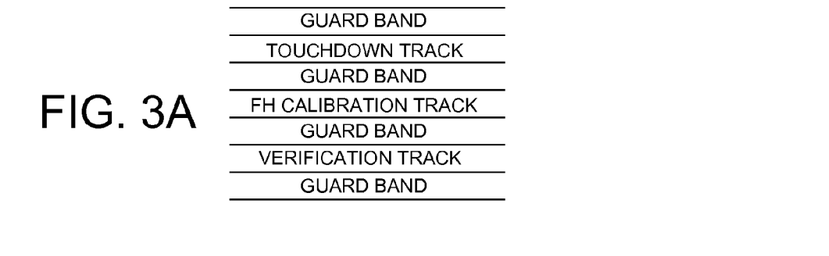
FIG. 3A shows an embodiment of the present invention wherein the disk comprises a touchdown track for executing a touchdown procedure, a fly height calibration track for calibrating the fly height control signal, and verification track for verifying the fly height control signal.

FIG. 2A shows a disk drive according to an embodiment of the present invention comprising a head 16 actuated over a disk 18 comprising a plurality of tracks 20 including a fly height calibration track (FIG. 3A). The disk drive further comprises a fly height actuator operable to control a fly height of the head in response to a fly height control signal 22. Control circuitry 24 executes the flow diagram of FIG. 2B wherein a touchdown operation is executed (step 26) to set an operating fly height control signal by adjusting the fly height control signal until the head contacts the disk. The fly height calibration track is read to set a fly height reference (step 28). When calibrating the operating fly height control signal (step 30), the fly height calibration track is read and the operating fly height control signal is adjusted in response to the fly height reference (step 32). A determination is made as to whether the adjusted operating fly height control signal is valid (step 34), and when the adjusted operating fly height control signal is invalid, the touchdown operation is re-executed to reset the operating fly height control signal (step 26) and the fly height calibration track is read to reset the fly height reference (step 28).

The disk 18 shown in the embodiment of FIG. 2A comprises a plurality of servo sectors $36_0$-$36_N$ that define the tracks 20. The control circuitry 24 processes a read signal 38 emanating from the head 16 to demodulate the servo sectors $36_0$-$36_N$ into a position error signal (PES) representing a position error of the head relative to a target data track. The control circuitry 24 comprises a servo compensator for filtering the PES to generate a control signal 40 applied to a voice coil motor (VCM) 42 that rotates an actuator arm 44 about a pivot in order to actuate the head 16 radially over the disk 18 in a direction that reduces the PES.

Any suitable fly height actuator may be employed, such as a heater which controls fly height through thermal expansion, or a piezoelectric (PZT) actuator integrated with the head 16. In one embodiment, the operating fly height control signal used during normal operation of the disk drive is determined by decreasing the fly height of the head 16 (by adjusting the fly height control signal 22) until the head 16 contacts the disk 18 (touchdown). The operating fly height control signal may then be determined, for example, relative to the fly height control signal applied to the fly height actuator that causes the touchdown. In one embodiment, the operating fly height control signal is determined by backing off the fly height control signal that causes the touchdown. In another embodiment, a suitable technique may be employed to measure the fly height of the head 16 relative to when the touchdown is detected, and then select the operating fly height control signal that achieves a target fly height. For example, the fly height control signal applied to the fly height actuator is correlated with the measured fly height based on when touchdown is detected so that an operating fly height control signal can be selected that will achieve a target fly height.

During the touchdown operation, the touchdown of the head may be detected in any suitable manner. In one embodiment, a microactuator may be integrated with the head (e.g., in a gimbal that couples a read/write element to a slider), or integrated with a suspension that couples a gimbal to the actuator arm 44, or mounted on the actuator arm 44, etc. The microactuator may be dedicated for detecting head touchdown, or it may also be used to actuate the head over the disk in fine movements during normal operation. Other embodiments may detect head touchdown by evaluating a temperature signal generated by a temperature sensor integrated with the head, wherein when head touchdown occurs, the temperature signal will exceed a threshold. Other techniques for detecting head touchdown include evaluating the amplitude of the read signal (e.g., when reading the servo bursts), evaluating the PES for servoing the head, and/or evaluating a servo wedge-to-wedge timing all of which may be affected by head touchdown.

After executing the touchdown operation in order to initialize the operating fly height control signal 22, the fly height calibration track (FIG. 3A) is read in order to initialize a fly height reference that corresponds to the initial operating fly height control signal. Over time, it may be necessary to recalibrate the operating fly height control signal in order to adjust the operating fly height of the head 16 to compensate for fly height deviation due, for example, to changing environmental conditions (e.g., temperature or pressure), or to changes in the response of the fly height actuator. The operating fly height control signal may be recalibrated in response to any suitable event, such as over a periodic interval, or if a touchdown of the head is detected during normal operation, or if an environmental sensor detects a change in an environmental condition that affects the fly height (e.g., a change in temperature or pressure). In order to recalibrate the operating fly height control signal, the fly height calibration track is read to estimate the fly height of the head relative to the fly height reference calibrated after the touchdown operation. However, the fly height calibration track may degrade over time due, for example, to general magnetic entropy or to magnetic interference from write operations of near adjacent tracks. Accordingly, in one embodiment of the present invention the operating fly height control signal is verified after calibration to ensure its validity. If the operating fly height control signal is invalid after calibration using the current fly height reference, the touchdown operation is re-executed in order to reset the fly height reference.

FIG. 3A shows an embodiment of the present invention wherein the disk comprises a touchdown track, a fly height calibration track, and a verification track. In the embodiment shown, the touchdown track, fly height calibration track, and the verification track are surrounded by one or more guard band tracks to protect against adjacent track interference. Although the embodiment of FIG. 3A shows a single touchdown, fly height calibration, and verification track, any suitable number of tracks may be employed. For example, multiple fly height calibration tracks may be employed (separated by guard band tracks) so that the fly height calibration tracks may be refreshed over time in a manner that accounts for thermal decay.

Any suitable technique may be employed to estimate the fly height by reading the fly height calibration track, including to generate a fly height estimate representing the fly height reference after executing the touchdown operation. In one embodiment, the fly height estimate is generated using a harmonic ratio (HR) method. After writing an NT pattern (e.g., 2T pattern) to the fly height calibration track, a fly height estimate is generated by reading the fly height calibration track and measuring an amplitude of the read signal at a first harmonic ($V_A$) and at a second harmonic ($V_B$). A log of the ratio ($V_A/V_B$) is then multiplied by ($\lambda/4\pi$), where $\lambda$ is the frequency of the NT read signal in the spatial domain (i.e., velocity/write_frequency). In one embodiment, the first harmonic is the fundamental harmonic of the NT read signal, and the second harmonic is the third harmonic of the NT read signal. The NT pattern may be written in the user data area between the servo sectors (FIG. 1A) and the HR fly height estimate generated at any suitable resolution (e.g., once per data sector). In another embodiment, the preamble and/or the servo bursts within the servo sectors and/or the preamble of a data sector may be read to generate the NT read signal for performing the HR fly height estimate.

Figure 3B:
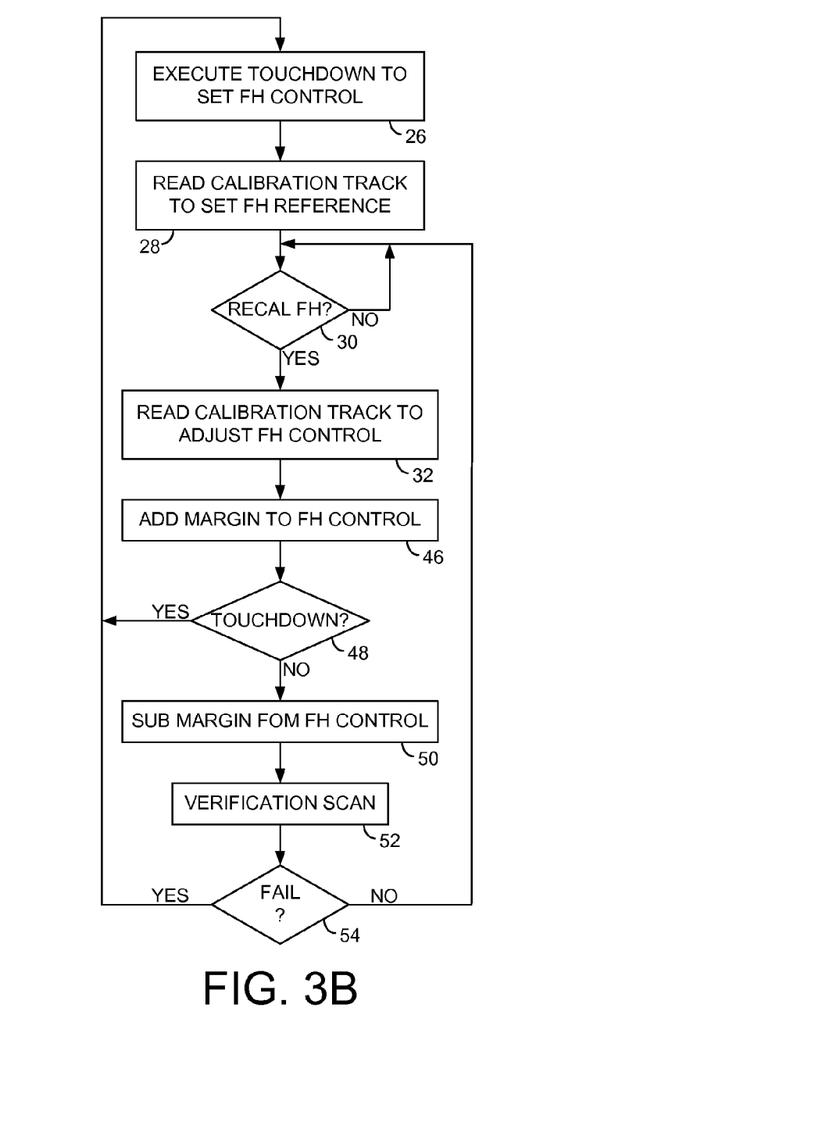
FIG. 3B is a flow diagram according to an embodiment of the present invention wherein a calibrated fly height control signal is verified by detecting whether it causes a touchdown of the head, or whether it passes a verification scan.

FIG. 3B is a flow diagram according to an embodiment of the present invention wherein after reading the fly height calibration track in order to adjust the operating fly height control signal (step 32), a margin is added to the adjusted operating fly height control signal (step 46) and a determination is made (step 48) as to whether the added margin causes a touchdown of the head. If a touchdown is detected, it means the adjusted operating fly height control signal is invalid. Therefore the touchdown operation is re-executed in order to reset the operating fly height control signal (step 26) and then the fly height calibration track is read in order to reset the fly height reference (step 28). If touchdown is not detected (step 48), then the margin is subtracted from the adjusted operating fly height control signal (step 50) and the verification track is read in order to perform a verification scan by evaluating any suitable channel metric (step 52). If the verification scan fails (step 54), it means the adjusted operating fly height control signal is invalid. Therefore the touchdown operation is re-executed in order to reset the operating fly height control signal (step 26) and then the fly height calibration track is read in order to reset the fly height reference (step 28).

Any suitable channel metric may be evaluated during the verification scan at step 52 of FIG. 3B by reading the verification track (FIG. 3A). In one embodiment, the channel metric comprises a metric of an error correction code (ECC) such as a suitable polynomial code (e.g., a Reed-Solomon code) or a suitable iterative code such as a low-density parity-check (LDPC) code. For example, the verification scan may fail if the number of detected symbol errors of a polynomial ECC exceeds a threshold, or if the log-likelihood ratios (LLRs) of an iterative code indicate a low confidence, or if the polynomial code or iterative code fail altogether to recover one or more data sectors. Other channel metrics that may be evaluated during the verification scan may include a sequence detector metric (e.g., branch metrics of a Viterbi sequence detector or LLRs of an iterative decoder), the gain setting of an automatic gain control circuit, the PES generated from the servo bursts of the servo sectors, etc.

Figure 4A:
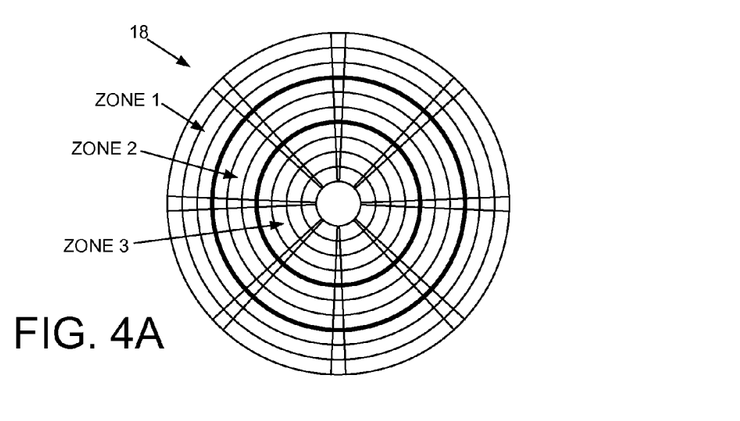
FIG. 4A shows an embodiment of the present invention wherein the disk comprises a plurality of zones each comprising a fly height calibration track.
Figure 4B:
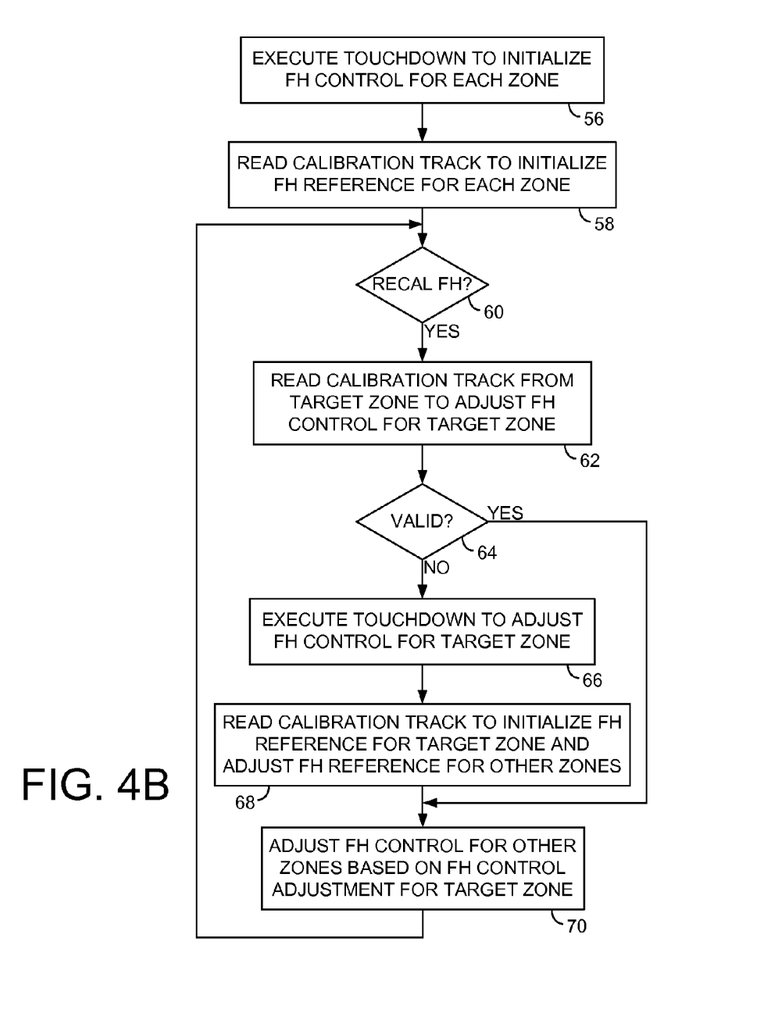
FIG. 4B is a flow diagram according to an embodiment of the present invention wherein when a fly height reference for a target zone is reset, the fly height reference for the other zones is adjusted accordingly.

FIGS. 4A and 4B illustrate an embodiment of the present invention wherein the disk 18 comprises a plurality of zones, and each zone comprises a plurality of tracks including a fly height calibration track. The touchdown operation is executed to initialize the operating fly height control signal for each of the zones (step 56). The fly height calibration track is then read in each zone to set a fly height reference for each zone (step 58). When calibrating the operating fly height control signal for a target zone (step 60), the fly height calibration track is read in the target zone and the operating fly height control signal is adjusted in response to the fly height reference for the target zone (step 62). A determination is made as to whether the adjusted operating fly height control signal for the target zone is valid (step 64). When the adjusted operating fly height control signal for the target zone is valid, the operating fly height control signal for the other zones is adjusted in response to the adjustment to the operating fly height control signal for the target zone (step 70). When the adjusted operating fly height control signal for the target zone is invalid (step 64), the touchdown operation is re-executed to reset the operating fly height control signal (step 66) and the fly height calibration track is reread in the target zone to adjust the fly height reference for the target zone, and the operating fly height reference for the other zones is adjusted in response to the adjustment to the fly height reference for the target zone (step 68). In another embodiment, the touchdown operation and resetting of the fly height reference may be performed for each zone.

Figure 5A:
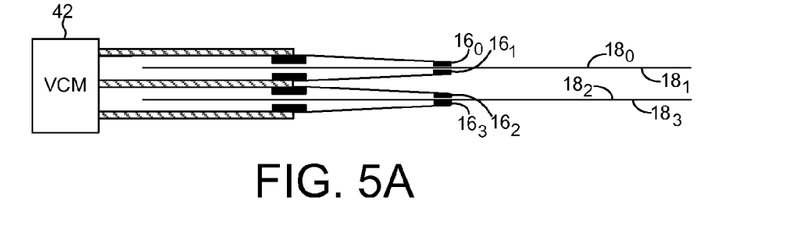
FIG. 5A shows an embodiment of the present invention wherein the disk drive comprises a plurality of disk surfaces each comprising a fly height calibration track.
Figure 5B:
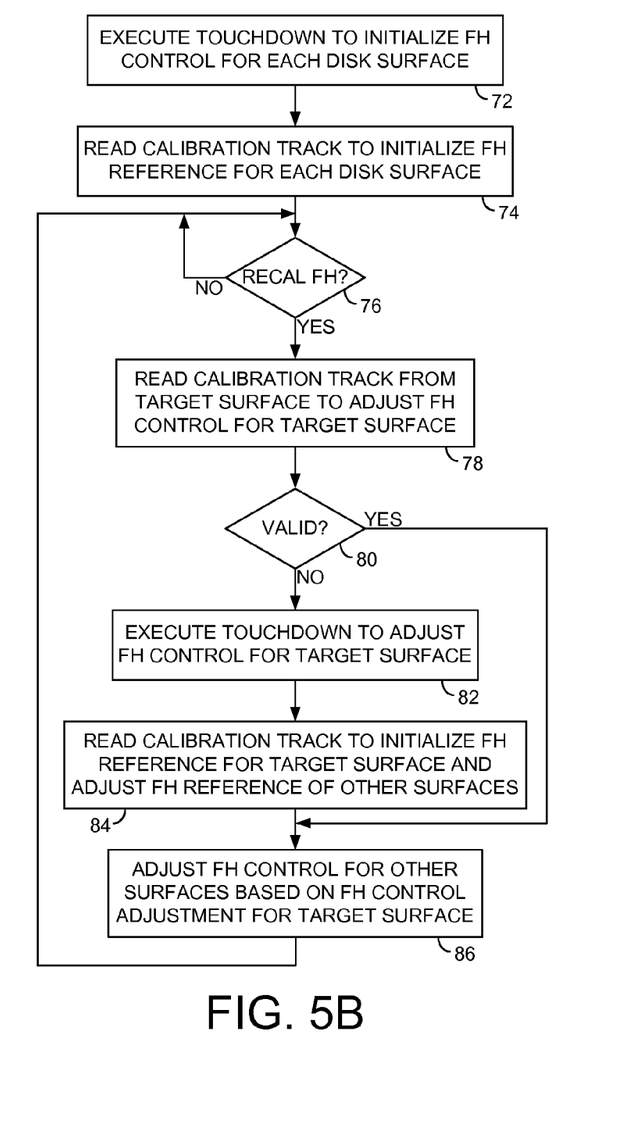
FIG. 5B is a flow diagram according to an embodiment of the present invention wherein when a fly height reference for a target disk surface is reset, the fly height reference for the other disk surfaces is adjusted accordingly.

FIGS. 5A and 5B illustrate an embodiment of the present invention wherein the disk drive comprises a plurality of disk surfaces $18_0$-$18_3$, and each disk surface comprises a plurality of tracks including a fly height calibration track. The touchdown operation is executed to set an operating fly height control signal for each disk surface (step 72). The fly height calibration track on each disk surface is then read to set a fly height reference for each disk surface (step 74). When calibrating the operating fly height control signal for a target disk surface (step 76), the fly height calibration track on the target disk surface is read and the operating fly height control signal is adjusted in response to the fly height reference for the target disk surface (step 78). A determination is made as to whether the adjusted operating fly height control signal for the target disk surface is valid (step 80). When the adjusted operating fly height control signal for the target disk surface is valid, the operating fly height control signal is adjusted for the other disk surfaces in response to the adjustment to the operating fly height control signal for the target disk surface (step 86). When the adjusted operating fly height control signal for the target disk surface is invalid, the touchdown operation is re-executed to reset the operating fly height control signal (step 82) and the fly height calibration track on the target disk surface is re-read to adjust the fly height reference for the target disk surface. The operating fly height reference is adjusted for the other disk surfaces in response to the adjustment to the operating fly height reference for the target disk surface (step 84). In another embodiment, the touchdown operation and resetting of the fly height reference may be performed for each disk surface. In yet another embodiment, each disk surface may comprise a number of zones as in FIG. 4A, and the fly height control signal and fly height reference may be adjusted for each zone on each disk surface in response to the fly height adjustment for a target zone on a target disk surface.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of tracks including a fly height calibration track;
    a head actuated over the disk;
    a fly height actuator operable to control a fly height of the head in response to a fly height control signal; and
    control circuitry operable to:
        execute a touchdown operation to set an operating fly height control signal by adjusting the fly height control signal until the head contacts the disk;
        read the fly height calibration track to set a fly height reference;
        when calibrating the operating fly height control signal, read the fly height calibration track and adjust the operating fly height control signal in response to the fly height reference;
        determine whether the adjusted operating fly height control signal is valid; and
        when the adjusted operating fly height control signal is invalid, re-execute the touchdown operation to reset the operating fly height control signal and reread the fly height calibration track to reset the fly height reference.

2. The disk drive as recited in claim 1, wherein the control circuitry is further operable to execute the touchdown operation by reading a touchdown track.

3. The disk drive as recited in claim 1, wherein the control circuitry is further operable to determine that the adjusted operating fly height control signal is invalid by:
 adding a margin to the adjusted operating fly height control signal to generate a margined fly height control signal; and
 detecting a touchdown of the head in response to the margined fly height control signal.

4. The disk drive as recited in claim 1, wherein the control circuitry is further operable to determine that the adjusted operating fly height control signal is invalid by evaluating a channel metric when reading data from the disk.

5. The disk drive as recited in claim 4, wherein the channel metric comprises an error correction code (ECC) metric.

6. The disk drive as recited in claim 4, wherein the channel metric comprises an sequence detector metric.

7. The disk drive as recited in claim 1, wherein the disk comprises a plurality of zones, each zone comprises a plurality of tracks including a fly height calibration track, and the control circuitry is further operable to:
 execute the touchdown operation to set an operating fly height control signal for each zone;
 read the fly height calibration track in each zone to set a fly height reference for each zone;
 when calibrating the operating fly height control signal for a target zone, read the fly height calibration track in the target zone and adjust the operating fly height control signal in response to the fly height reference for the target zone;
 determine whether the adjusted operating fly height control signal for the target zone is valid; and
 when the adjusted operating fly height control signal for the target zone is valid, adjust the operating fly height control signal for the other zones in response to the adjustment to the operating fly height control signal for the target zone.

8. The disk drive as recited in claim 7, wherein when the adjusted operating fly height control signal for the target zone is invalid, the control circuitry is further operable to:
 re-execute the touchdown operation to reset the operating fly height control signal and reread the fly height calibration track in the target zone to adjust the fly height reference for the target zone; and
 adjust the operating fly height reference for the other zones in response to the adjustment to the fly height reference for the target zone.

9. The disk drive as recited in claim 1, wherein the disk drive comprises a plurality of disk surfaces, each disk surface comprises a plurality of tracks including a fly height calibration track, and the control circuitry is further operable to:
 execute the touchdown operation to set an operating fly height control signal for each disk surface;
 read the fly height calibration track on each disk surface to set a fly height reference for each disk surface;
 when calibrating the operating fly height control signal for a target disk surface, read the fly height calibration track on the target disk surface and adjust the operating fly height control signal in response to the fly height reference for the target disk surface;
 determine whether the adjusted operating fly height control signal for the target disk surface is valid; and
 when the adjusted operating fly height control signal for the target disk surface is valid, adjust the operating fly height control signal for the other disk surfaces in response to the adjustment to the operating fly height control signal for the target disk surface.

10. The disk drive as recited in claim 9, wherein when the adjusted operating fly height control signal for the target disk surface is invalid, the control circuitry is further operable to:
 re-execute the touchdown operation to reset the operating fly height control signal and reread the fly height calibration track on the target disk surface to adjust the fly height reference for the target disk surface; and
 adjust the operating fly height reference for the other disk surfaces in response to the adjustment to the operating fly height reference for the target disk surface.

11. A method of operating a disk drive, the disk drive comprising a head actuated over a disk comprising a plurality of tracks including a fly height calibration track, and a fly height actuator operable to control a fly height of the head in response to a fly height control signal, the method comprising:
 executing a touchdown operation to set an operating fly height control signal by adjusting the fly height control signal until the head contacts the disk;
 reading the fly height calibration track to set a fly height reference;
 when calibrating the operating fly height control signal, reading the fly height calibration track and adjust the operating fly height control signal in response to the fly height reference;
 determining whether the adjusted operating fly height control signal is valid; and
 when the adjusted operating fly height control signal is invalid, re-executing the touchdown operation to reset the operating fly height control signal and reread the fly height calibration track to reset the fly height reference.

12. The method as recited in claim 11, further comprising executing the touchdown operation by reading a touchdown track.

13. The method as recited in claim 11, further comprising determining that the adjusted operating fly height control signal is invalid by:
 adding a margin to the adjusted operating fly height control signal to generate a margined fly height control signal; and
 detecting a touchdown of the head in response to the margined fly height control signal.

14. The method as recited in claim 11, further comprising determining that the adjusted operating fly height control signal is invalid by evaluating a channel metric when reading data from the disk.

15. The method as recited in claim 14, wherein the channel metric comprises an error correction code (ECC) metric.

16. The method as recited in claim 14, wherein the channel metric comprises a sequence detector metric.

17. The method as recited in claim 11, wherein the disk comprises a plurality of zones, each zone comprises a plurality of tracks including a fly height calibration track, and the method further comprises:
 executing the touchdown operation to set an operating fly height control signal for each zone;
 reading the fly height calibration track in each zone to set a fly height reference for each zone;
 when calibrating the operating fly height control signal for a target zone, reading the fly height calibration track in the target zone and adjust the operating fly height control signal in response to the fly height reference for the target zone;
 determining whether the adjusted operating fly height control signal for the target zone is valid; and
 when the adjusted operating fly height control signal for the target zone is valid, adjusting the operating fly height control signal for the other zones in response to the adjustment to the operating fly height control signal for the target zone.

18. The method as recited in claim 17, wherein when the adjusted operating fly height control signal for the target zone is invalid, the method further comprises:
   re-executing the touchdown operation to reset the operating fly height control signal and reread the fly height calibration track in the target zone to adjust the fly height reference for the target zone; and
   adjusting the operating fly height reference for the other zones in response to the adjustment to the fly height reference for the target zone.

19. The method as recited in claim 11, wherein the disk drive comprises a plurality of disk surfaces, each disk surface comprises a plurality of tracks including a fly height calibration track, and the method further comprises:
   executing the touchdown operation to set an operating fly height control signal for each disk surface;
   reading the fly height calibration track on each disk surface to set a fly height reference for each disk surface;
   when calibrating the operating fly height control signal for a target disk surface, reading the fly height calibration track on the target disk surface and adjust the operating fly height control signal in response to the fly height reference for the target disk surface;
   determining whether the adjusted operating fly height control signal for the target disk surface is valid; and
   when the adjusted operating fly height control signal for the target disk surface is valid, adjusting the operating fly height control signal for the other disk surfaces in response to the adjustment to the operating fly height control signal for the target disk surface.

20. The disk drive as recited in claim 19, wherein when the adjusted operating fly height control signal for the target disk surface is invalid, the method further comprises:
   re-executing the touchdown operation to reset the operating fly height control signal and reread the fly height calibration track on the target disk surface to adjust the fly height reference for the target disk surface; and
   adjusting the operating fly height reference for the other disk surfaces in response to the adjustment to the operating fly height reference for the target disk surface.

* * * * *